(12) United States Patent
Chen

(10) Patent No.: US 10,984,750 B1
(45) Date of Patent: Apr. 20, 2021

(54) VOLTAGE OUTPUT SYSTEM AND LIQUID CRYSTAL DISPLAY DEVICE

(71) Applicant: Shenzhen China Star Optoelectronics Technology Co., Ltd., Shenzhen (CN)

(72) Inventor: Shuai Chen, Shenzhen (CN)

(73) Assignee: SHENZHEN CHINA STAR OPTOELECTRONICS TECHNOLOGY CO., LTD., Guangdong (CN)

( * ) Notice: Subject to any disclaimer, the term of this patent is extended or adjusted under 35 U.S.C. 154(b) by 369 days.

(21) Appl. No.: 16/312,286

(22) PCT Filed: Sep. 26, 2018

(86) PCT No.: PCT/CN2018/107777
§ 371 (c)(1),
(2) Date: Dec. 21, 2018

(87) PCT Pub. No.: WO2019/232987
PCT Pub. Date: Dec. 12, 2019

(30) Foreign Application Priority Data

Jun. 5, 2018 (CN) .......................... 201810570573.6

(51) Int. Cl.
*G09G 3/00* (2006.01)
*G09G 3/36* (2006.01)
(Continued)

(52) U.S. Cl.
CPC ....... *G09G 3/3696* (2013.01); *G02F 1/13452* (2013.01); *G06F 1/16* (2013.01);
(Continued)

(58) Field of Classification Search
CPC ............ G09G 3/006–3696; G09G 2310/0289
See application file for complete search history.

(56) References Cited

U.S. PATENT DOCUMENTS 5,841,414 A * 11/1998 Tanaka ................ G02F 1/13452
345/87
6,380,918 B1 * 4/2002 Chiba ................. G02F 1/13452
345/90
(Continued)

FOREIGN PATENT DOCUMENTS

CN          1132053 C      12/2003
CN     101075028 A      11/2007
(Continued)

*Primary Examiner* — Lin Li
(74) *Attorney, Agent, or Firm* — Leong C. Lei

(57) ABSTRACT

The invention provides a voltage output system and LCD device. The voltage output system is disposed with a variable resistor, one end of the variable resistor is connected to the input voltage transmitted by the level-shifting unit through a contact and a wire, and the other end of the variable resistor is electrically connected to the LCD panel to output an output voltage through a contact and a wire. After the voltage output system is disposed on the assembled circuit board of the LCD device, when the LCD device is tested, the output voltage of the voltage output system can be preset by adjusting the resistance of the variable resistor so that the required different voltages can be provided to the LCD panel conveniently and quickly, which simplifies the test of the LCD device and reduces the product cost.

9 Claims, 4 Drawing Sheets

(51) Int. Cl.
*G06F 3/14* (2006.01)
*G02F 1/1345* (2006.01)
*H02M 7/00* (2006.01)
*G06F 1/16* (2006.01)

(52) U.S. Cl.
CPC .......... *G06F 3/1423* (2013.01); *G09G 3/006* (2013.01); *G09G 2310/0289* (2013.01); *H02M 7/003* (2013.01)

(56) References Cited

U.S. PATENT DOCUMENTS

| | | | |
|---|---|---|---|
| 2005/0253773 A1* | 11/2005 | Sekiguchi | G06F 3/1423 345/1.1 |
| 2008/0198125 A1 | 8/2008 | Park | |
| 2008/0239184 A1* | 10/2008 | Kim | G09G 3/3696 349/41 |
| 2016/0255714 A1* | 9/2016 | Hiramitsu | H02M 7/003 361/709 |
| 2017/0102819 A1* | 4/2017 | Hashimoto | G06F 1/16 |

FOREIGN PATENT DOCUMENTS

| | | |
|---|---|---|
| CN | 102662265 A | 9/2012 |
| CN | 106057141 A | 10/2016 |
| CN | 205986622 U | 2/2017 |
| CN | 106647044 A | 5/2017 |
| CN | 206179483 U | 5/2017 |

\* cited by examiner

VOLTAGE OUTPUT SYSTEM AND LIQUID CRYSTAL DISPLAY DEVICE

BACKGROUND OF THE INVENTION

1. Field of the Invention

The present invention relates to the field of display, and in particular to a voltage output system and liquid crystal display (LCD) device.

2. The Related Arts

With the development of display technology, the panel display devices such as liquid crystal displays (LCDs), due to the advantages of high image quality, power saving, thinness and wide application range, are widely applied to various consumer electronic products, such as, mobile phones, televisions, personal digital assistants (PDA), digital cameras, notebook computers, and desktop computers, and have become mainstream in display devices.

Most of the LCD devices available on the market are backlight type LCD devices, which comprise an LCD panel and a backlight module. The operating principle behind the LCD panel is to place liquid crystal (LC) molecules in two parallel glass substrates. A plurality of vertical and horizontal thin wires are disposed between the two glass substrates, and the LC molecules are controlled to change direction by whether the electricity is supplied to the thin wires or not, which can refract the light of the backlight module to produce an image.

A conventional LCD device generally comprises an LCD panel, a chip on film (COF) bonded to the LCD panel, an X-board bonded to the COF, and a C-board connected to the X-board through a flexible flat cable (FFC). The C-board is disposed with a voltage level-shifting chip for converting the input single voltage level signal into different voltage level signals and outputting to the LCD panel, that is, converting the input voltage into an output voltage for output. The output voltage from the output of the existing level-shifting chip is generally not freely adjustable in a wide range. Therefore, the prior art generally designs a voltage output system electrically connected to the level-shifting unit and the LCD panel to control the voltage level of the output voltage to the LCD panel.

Refer to FIG. 1. FIG. 1 is a schematic view of the structure of a conventional voltage output system. The conventional voltage output system comprises a circuit board body 100, a first solder contact point 210 and a second solder contact point 220 disposed on the circuit board body 100, a zero-ohm resistor 300 soldered to the first solder contact point 210 and the second solder contact point 220, and the first metal wire 410 and the second metal wire 420 disposed in the board body 100. One end of the first metal wire 410 is electrically connected to a level-shifting unit 500 disposed on the C board of the LCD device, and the other end is electrically connected to the first solder contact point 210. One end of the second metal wire 420 is electrically connected to the second solder contact point 220, and the other end is electrically connected to the LCD panel 600 of the LCD device. During operation, the voltage is inputted from the level-shifting unit 500 to the voltage output system, and is output to the LCD panel after passing the the zero-ohm resistor 300. When an external voltage is required, as shown in FIG. 2, the zero-ohm resistor 300 is removed, and a power source 700 is soldered on the second solder contact point 220. The power source 700 directly supplies an output voltage having a specific voltage value to the LCD panel 600.

When applied to an LCD device wherein an X-board and a C-board are disposed separately, the above voltage output system is provided on the C-board. In the reliability test, a C-board with a complete voltage output system is usually put into the experimental environment for lighting. After a certain period of time, the voltage output system is replaced with an above voltage output system with zero-ohm resistor removed and uses a power supply to provide an output voltage of a specific voltage value for the external voltage measurement experiment, so as to avoid repeated assembly and disassembly of the zero-ohm resistor. However, to save cost, the prior art often designs an assembled circuit board that combines the X-board and the C-board. The assembled circuit board is directly bonded to the LCD panel through the COF, and the voltage output system is included in the assembled circuit board. As such, in the reliability experiment, it is necessary to repeatedly assemble and disassemble the zero-ohm resistance of the voltage output system to realize the output voltage of different voltage values to the LCD panel, which not only complicates the experimental operation, but also causes, in the process of repeated disassembly and assembly, the solder contact points of the voltage output system to be easily oxidized and unable to be soldered again.

SUMMARY OF THE INVENTION

The object of the present invention is to provide a voltage output system, applicable to an LCD device, and able to provide an output voltage of different voltage values to the LCD panel, thereby simplifying the experimental operation of the LCD device at low cost.

Another object of the present invention is to provide an LCD device, able to provide an output voltage of different voltage values to the LCD panel, thereby simplifying the experimental operation of the LCD device at low cost.

To achieve the above object, the present invention provides a voltage output system, which comprises: a first circuit board body, a second circuit board body, a first contact, a second contact, a third contact and a fourth contact disposed on the first circuit board body, a fifth contact and a sixth contact disposed on the second circuit board body, a first wire and a second wire disposed in the first circuit board body, a third wire and a fourth wire disposed in the second circuit board body, and a variable resistor;

wherein the third contact being electrically connected to the fifth contact, and the fourth contact being electrically connected to the sixth contact; the first wire electrically connecting the first contact and the third contact; the second wire electrically connecting the second contact and the fourth contact; one end of the third wire being electrically connected to an input voltage, and the other end electrically connected to the fifth contact; one end of the fourth wire being electrically connected to the sixth contact, and the other end outputting an output voltage; two ends of the variable resistor being electrically connected to the first contact and the second contact respectively.

The first circuit board body is disposed opposite to the second circuit board body;

the first contact, the second contact and the variable resistor are both located on a side of the first circuit board body away from the second circuit board body; the third contact and the fourth contact are both located on a side of the first circuit board body adjacent to the second circuit board body; the fifth contact and the sixth contact are both located on a side of the second circuit board body adjacent to the first circuit board body.

The two ends of the variable resistor are respectively soldered on the first contact and the second contact; the third contact is soldered on the fifth contact; and the fourth contact is soldered on the sixth contact.

The first contact, the second contact, the fifth contact and the sixth contact are all made of tin.

The third contact and the fourth contact are both made of metal.

One end of the third wire is electrically connected to a level-shifting unit; the input voltage is provided by the level-shifting unit;

the other end of the fourth wire is electrically connected to a liquid crystal display (LCD) panel, and outputs an output voltage to the LCD panel.

The voltage output system further comprises a seventh contact disposed on the first circuit board body; the seventh contact is located on the side of the first circuit board body away from the second circuit board body; the second wire electrically connects the seventh contact to the second contact and the fourth contact;

the seventh contact is electrically connected to a voltage measuring unit;

the voltage measuring unit is configured to measure a magnitude of the output voltage, and resistance of the variable resistor is adjusted according to the magnitude of the output voltage measured by the voltage measuring unit, so that the output voltage is at a preset required voltage level.

The seventh contact is made of tin.

The first wire, the second wire, the third wire, and the fourth wire are all made of metal.

The present invention also provides a liquid crystal display (LCD) device, comprising an LCD panel, a chip-on-film (COF) bonded to the LCD panel, and an assembled circuit board bonded to the COF;

the assembled circuit board is disposed with the above voltage output system.

The present invention provides the following advantages: the voltage output system of the present invention is disposed with a variable resistor, one end of the variable resistor is connected to the input voltage transmitted by the level-shifting unit through a contact and a wire, and the other end of the variable resistor is electrically connected to the LCD panel to output an output voltage through a contact and a wire. After the voltage output system is disposed on the assembled circuit board of the LCD device, when the LCD device is tested, the output voltage of the voltage output system can be preset by adjusting the resistance of the variable resistor so that the required different voltages can be provided to the LCD panel conveniently and quickly, which simplifies the test of the LCD device and reduces the product cost. The LCD device provided by the invention can supply the output voltage of different voltage values to the LCD panel, thereby effectively simplifying the test of the LCD device at low cost.

BRIEF DESCRIPTION OF THE DRAWINGS

To make the technical solution of the embodiments according to the present invention, a brief description of the drawings that are necessary for the illustration of the embodiments will be given as follows. Apparently, the drawings described below show only example embodiments of the present invention and for those having ordinary skills in the art, other drawings may be easily obtained from these drawings without paying any creative effort. In the drawings.

DETAILED DESCRIPTION OF THE PREFERRED EMBODIMENTS

To further explain the technical means and effect of the present invention, the following refers to embodiments and drawings for detailed description.

Figure 1:
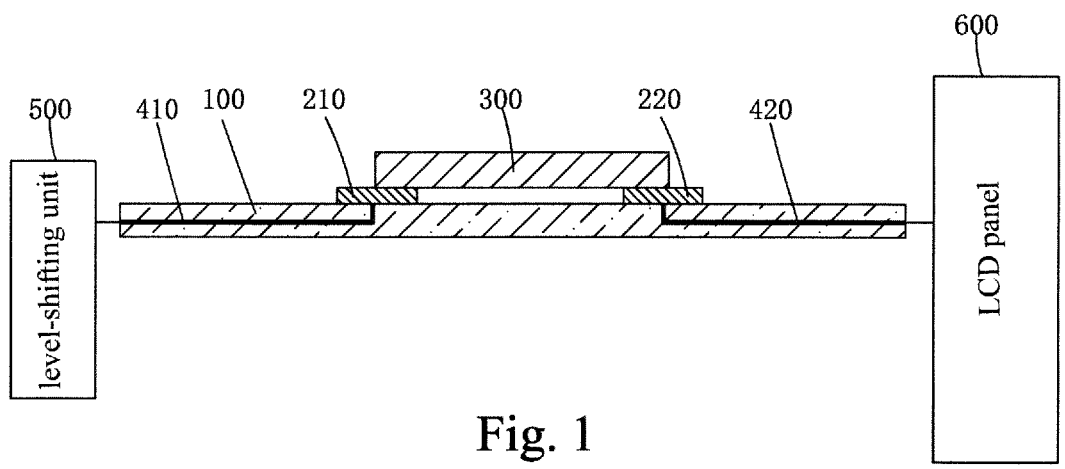
FIG. 1 is a schematic view showing the structure of a known voltage output system.
Figure 2:
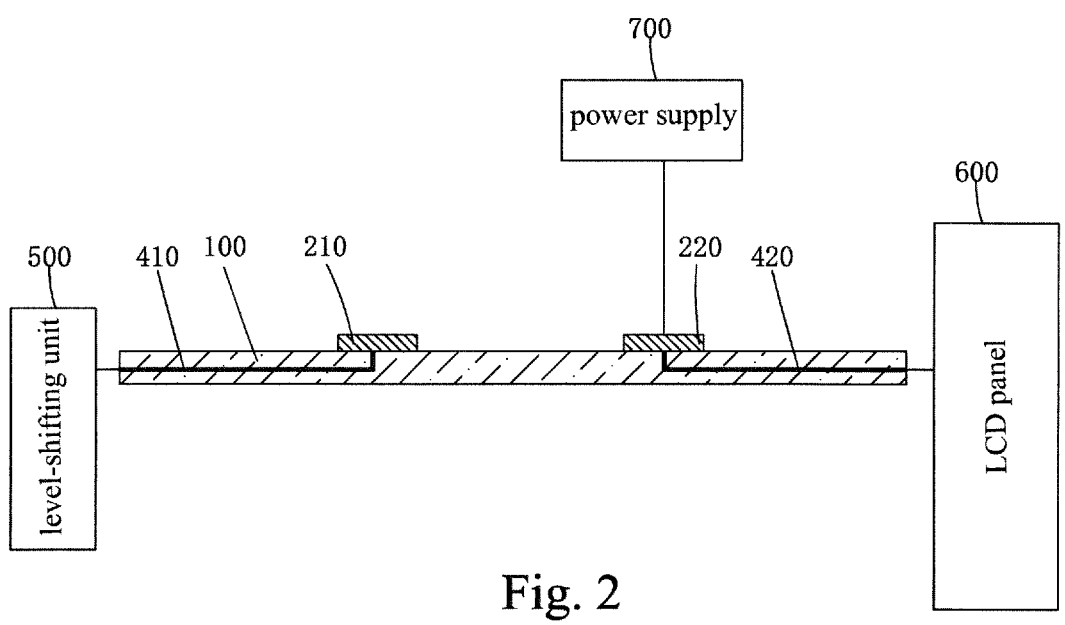
FIG. 2 is a schematic view showing the voltage output system in FIG. 1 removing zero-ohm resistor and receiving a power supply.
Figure 3:
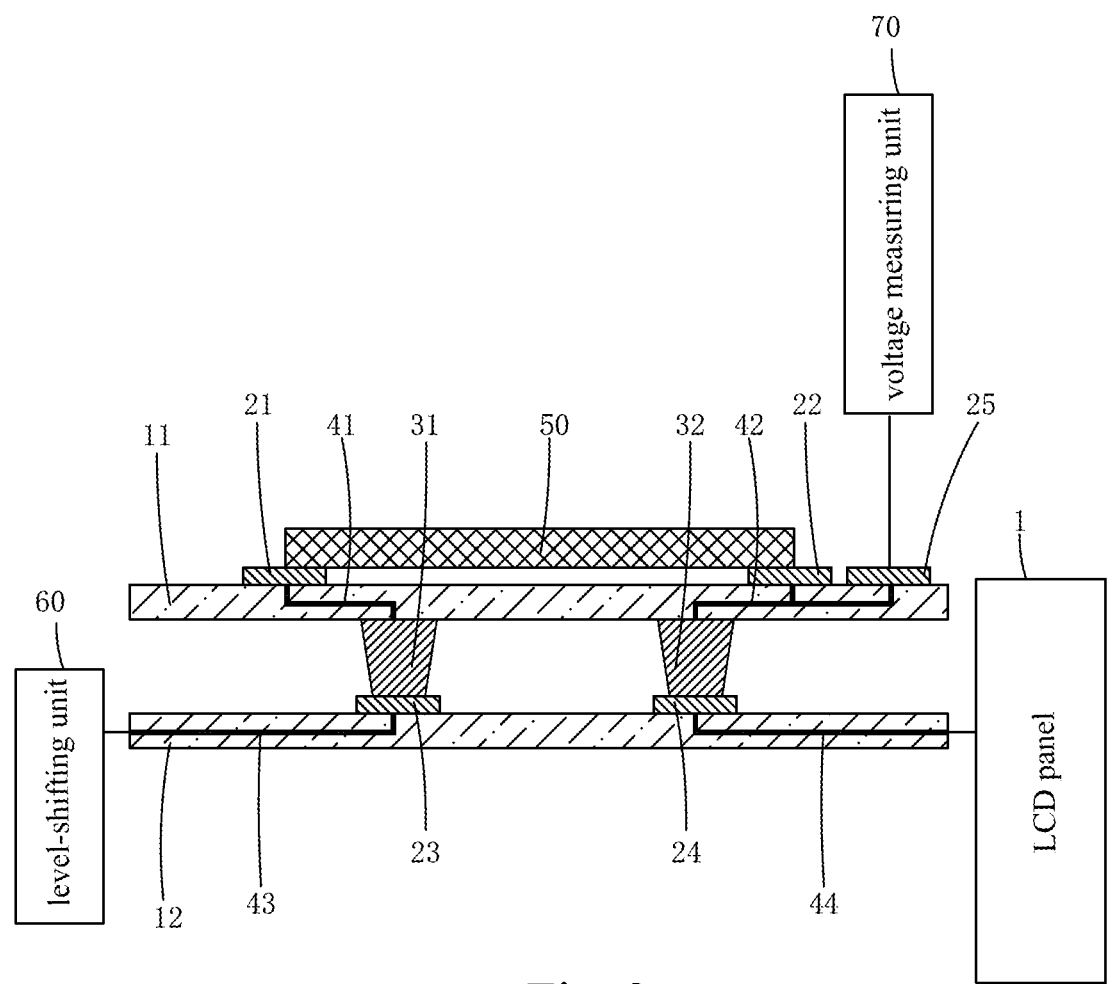
FIG. 3 is a schematic view showing the structure of a voltage output system of the present invention.

Refer to FIG. 3. The present invention provides a voltage output system, which comprises: a first circuit board body 11, a second circuit board body 12, a first contact 21, a second contact 22, a third contact 31, a fourth contact 32 and a seventh contact 25 disposed on the first circuit board body 11, a fifth contact 23 and a sixth contact 24 disposed on the second circuit board body 12, a first wire 41 and a second wire 42 disposed in the first circuit board body 11, a third wire 43 and a fourth wire 44 disposed in the second circuit board body 12, and a variable resistance 50.

The third contact 31 is electrically connected to the fifth contact 23, and the fourth contact 32 is electrically connected to the sixth contact 24; the first wire 41 electrically connects the first contact 21 and the third contact 31; the second wire 42 electrically connects the second contact 22, the fourth contact 32 and the seventh contact 25. One end of the third wire 43 is electrically connected to a level-shifting unit 60 to receive an input voltage from the level-shifting unit 60, and the other end is electrically connected to the fifth contact 23. One end of the fourth wire 44 is electrically connected to the sixth contact 24, and the other end is electrically connected to an LCD panel 1 to output an output voltage to the LCD panel 1. Two ends of the variable resistor 50 is electrically connected to the first contact 21 and the second contact 22 respectively. The seventh contact 25 is electrically connected to a voltage measuring unit 70, and the voltage measuring unit 70 is for measuring the voltage level of the output voltage.

Specifically, the first circuit board body 11 is disposed opposite to the second circuit board body 12. The first contact 21, the second contact 22, the seventh contact 25, and the variable resistor 50 are all located on a side of the first circuit board body 11 away from the second circuit board body 12. The third contact 31 and the fourth contact 32 are both located on a side of the first circuit board body 11 adjacent to the second circuit board body 12; the fifth contact 23 and the sixth contact 24 are both located on a side of the second circuit board body 12 adjacent to the first circuit board body 11.

Specifically, the two ends of the variable resistor 50 are respectively soldered on the first contact 21 and the second contact 22; the third contact 31 is soldered on the fifth contact 23; and the fourth contact 32 is soldered on the sixth contact 24.

Specifically, the first contact 21, the second contact 22, the fifth contact 23, the sixth contact 24, and the seventh contact 25 are all made of tin.

Specifically, the third contact 31 and the fourth contact 32 are both made of metal.

Specifically, the first wire 41, the second wire 42, the third wire 43 and the fourth wire 44 are all made of metal.

It should be noted that the voltage output system of the present invention is provided with a variable resistor 50, and one end of the variable resistor 50 is electrically connected to the level-shifting unit 60 to receive an input voltage from the level-shifting unit 60 through a voltage input path formed by the first contact 21, the first wire 41, the third contact 31, the fifth contact 23, and the third wire 43, and the other end of the variable resistor 50 is electrically connected to the LCD panel 1 to output an output voltage to the LCD panel 1 through the voltage output path formed by the second contact 22, the second wire 42, and the fourth contact 32, the sixth contact 24, and the fourth wire 44. When applying the voltage output system to the LCD device, the voltage output system is disposed on an assembled circuit board composed of a combination of a C-board and an X-board in the LCD device. When testing the LCD device, the resistance of the variable resistor 50 can be adjusted to change the voltage outputted from the voltage output system to the LCD panel 1. Specifically, the resistance of the variable resistor 50 is increased to increase the voltage on the variable resistor 50, thereby reducing the voltage level of the output voltage. On the other hand, the resistance of the variable resistor 50 is decreased to decrease the voltage on the variable resistor 50, thereby increasing the voltage level of the output voltage. As such, the present invention is able to supply the LCD panel 1 with different levels of output voltages at different stages of the test, and is not required to repeatedly assemble and disassemble components, as opposed to the prior art, which effectively simplifies the test of the LCD device, and avoids the failure of the voltage output system due to repeated disassembly and assembly of components, thereby effectively reducing the product cost.

Moreover, since the resistance of the wires in the LCD panel 1 is uncertain, the voltage output system of the present invention adjusts the output voltage based on the principle of resistance division. To facilitate adjustment of the output voltage, the present invention also provides the seventh contact 25, which is electrically connected to the voltage measuring unit 70, and the output voltage can be measured by the voltage measuring unit 70. The output voltage measured by the voltage measuring unit 70 is compared with a preset required voltage value. The resistance of the variable resistor 50 is adjusted according to the magnitude of the output voltage measured by the voltage measuring unit 70, so that the output voltage is at the preset required voltage. Specifically, when the output voltage measured by the voltage measuring unit 70 is greater than the preset required voltage, then the resistance of the variable resistor 50 is increased. When the output voltage measured by the voltage measuring unit 70 is less than the preset required voltage, the resistance of the variable resistor 50 is decreased. As such, the output voltage adjustment is further enhanced, and the operability further simplifies the test of the LCD device.

Figure 4:
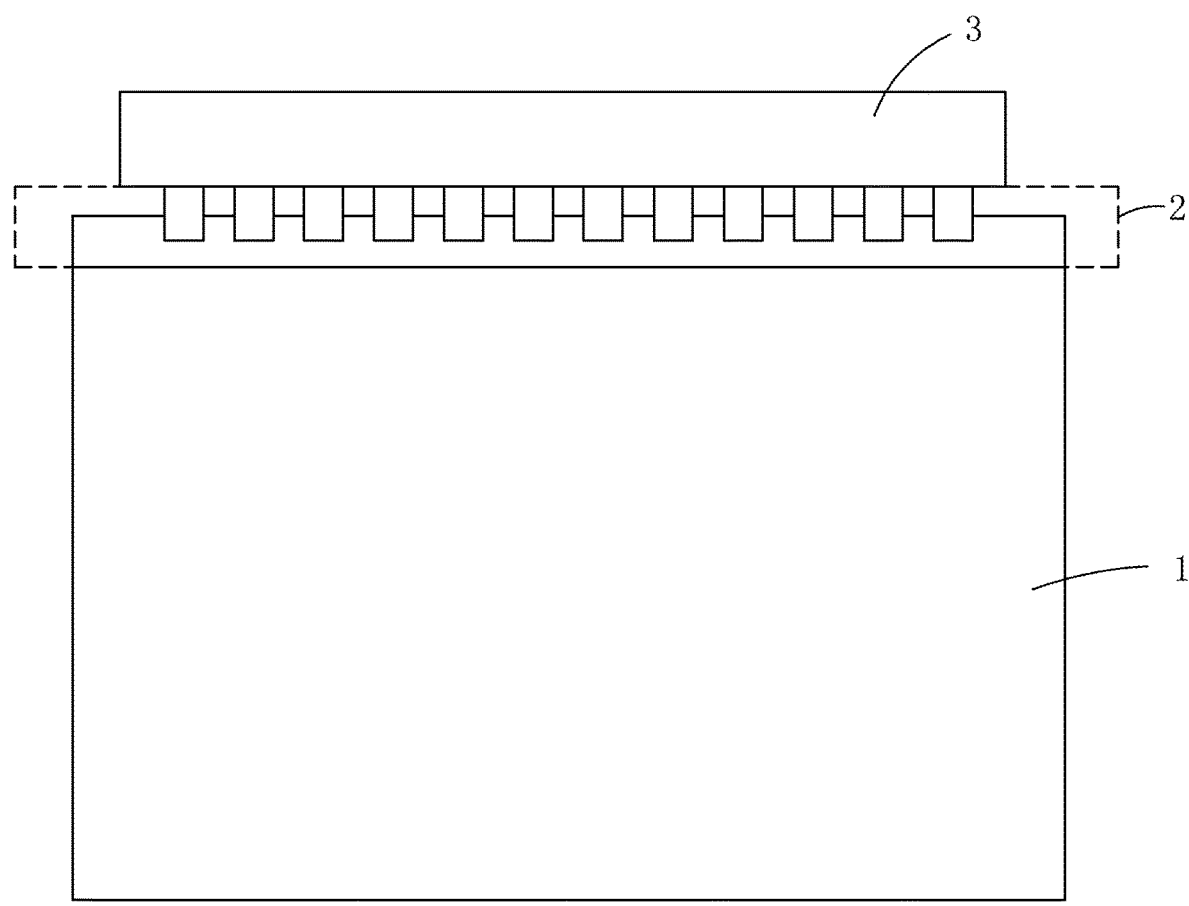
FIG. 4 is a schematic view showing the structure of an LCD device of the present invention.

Refer to FIG. 4, and also FIG. 3. Based on the same concept, the present invention also provides an LCD device, which comprises: the LCD panel 1, a chip-on-film (COF) 2 bonded to the LCD panel 1, and an assembled circuit board 3 bonded to the COF 2.

Wherein, the assembled circuit board 3 is an assembled circuit board obtained by combining a C-board and an X-board of the prior art, and the assembled circuit board 3 is disposed with and electrically connected to the above voltage output system. The level-shifting unit is also disposed on the assembled circuit board 3. The description of the structure of the voltage output system will not be repeated here.

The LCD device of the present invention utilizes the voltage output system described above, so that the voltage input to the LCD panel 1 can be conveniently adjusted, and the LCD device can be easily and quickly tested. In various stages of the test, the LCD panel 1 is supplied with different levels of output voltages. Compared with the prior art, the invention does not need to repeatedly disassemble and assemble components, which effectively simplifies the test of the LCD device and avoids failure of the voltage output system caused by repeated disassembly and assembly of components, thereby effectively reducing product costs.

In summary, the voltage output system of the present invention is disposed with a variable resistor, one end of the variable resistor is connected to the input voltage transmitted by the level-shifting unit through a contact and a wire, and the other end of the variable resistor is electrically connected to the LCD panel to output an output voltage through a contact and a wire. After the voltage output system is disposed on the assembled circuit board of the LCD device, when the LCD device is tested, the output voltage of the voltage output system can be preset by adjusting the resistance of the variable resistor so that the required different voltages can be provided to the LCD panel conveniently and quickly, which simplifies the test of the LCD device and reduces the product cost. The LCD device provided by the invention can supply the output voltage of different voltage values to the LCD panel, thereby effectively simplifying the test of the LCD device at low cost.

It should be noted that in the present disclosure the terms, such as, first, second are only for distinguishing an entity or operation from another entity or operation, and does not imply any specific relation or order between the entities or operations. Also, the terms "comprises", "include", and other similar variations, do not exclude the inclusion of other non-listed elements. Without further restrictions, the expression "comprises a . . . " does not exclude other identical elements from presence besides the listed elements.

Embodiments of the present invention have been described, but not intending to impose any unduly constraint to the appended claims. Any modification of equivalent structure or equivalent process made according to the disclosure and drawings of the present invention, or any application thereof, directly or indirectly, to other related fields of technique, is considered encompassed in the scope of protection defined by the claims of the present invention.

What is claimed is:

1. A liquid crystal display (LCD) device, comprising an LCD panel, and a chip-on-film (COF) bounded to the LCD panel, and an assembled circuit board bounded to the COF; the assembled circuit includes a voltage output system, wherein the voltage output system further comprising:

a first circuit board body, a second circuit board body, a first contact, a second contact, a third contact and a fourth contact disposed on the first circuit board body, a fifth contact and a sixth contact disposed on the second circuit board body, a first wire and a second wire disposed in the first circuit board body, a third wire and a fourth wire disposed in the second circuit board body, and a variable resistor;

wherein the third contact being electrically connected to the fifth contact, and the fourth contact being electrically connected to the sixth contact; the first wire electrically connecting the first contact and the third contact; the second wire electrically connecting the second contact and the fourth contact; one end of the third wire being electrically connected to an input voltage, and the other end electrically connected to the fifth contact; one end of the fourth wire being electrically connected to the sixth contact, and the other end outputting an output voltage; two ends of the variable resistor being electrically connected to the first contact and the second contact respectively.

2. The voltage output system as claimed in claim 1, wherein the first circuit board body is disposed opposite to the second circuit board body;
the first contact, the second contact and the variable resistor are both located on a side of the first circuit board body away from the second circuit board body; the third contact and the fourth contact are both located on a side of the first circuit board body adjacent to the second circuit board body; the fifth contact and the sixth contact are both located on a side of the second circuit board body adjacent to the first circuit board body.

3. The voltage output system as claimed in claim 2, wherein the two ends of the variable resistor are respectively soldered on the first contact and the second contact; the third contact is soldered on the fifth contact; and the fourth contact is soldered on the sixth contact.

4. The voltage output system as claimed in claim 3, wherein the first contact, the second contact, the fifth contact and the sixth contact are all made of tin.

5. The voltage output system as claimed in claim 2, wherein the voltage output system further comprises a seventh contact disposed on the first circuit board body; the seventh contact is located on the side of the first circuit board body away from the second circuit board body; the second wire electrically connects the seventh contact to the second contact and the fourth contact;

the seventh contact is electrically connected to a voltage measuring unit;

the voltage measuring unit is configured to measure a magnitude of the output voltage, and resistance of the variable resistor is adjusted according to the magnitude of the output voltage measured by the voltage measuring unit, so that the output voltage is at a preset required voltage level.

6. The voltage output system as claimed in claim 5, wherein the seventh contact is made of tin.

7. The voltage output system as claimed in claim 1, wherein the third contact and the fourth contact are both made of metal.

8. The voltage output system as claimed in claim 1, wherein one end of the third wire is electrically connected to a level-shifting unit; the input voltage is provided by the level-shifting unit;

the other end of the fourth wire is electrically connected to a liquid crystal display (LCD) panel, and outputs an output voltage to the LCD panel.

9. The voltage output system as claimed in claim 1, wherein the first wire, the second wire, the third wire, and the fourth wire are all made of metal.

* * * * *